United States Patent [19]

Sweeney

[11] 4,331,426
[45] May 25, 1982

[54] CARDIOPULMONARY RESUSCITATION MANIKIN WITH ANTISEPTIC CLEANING SYSTEM

[75] Inventor: Kevin M. Sweeney, Woodstock, N.Y.

[73] Assignee: Simulaids, Inc., Woodstock, N.Y.

[21] Appl. No.: 199,291

[22] Filed: Oct. 21, 1980

[51] Int. Cl.³ .............................................. G09B 23/28
[52] U.S. Cl. .................................................. 434/265
[58] Field of Search ......................... 434/265, 266, 267

[56] References Cited

U.S. PATENT DOCUMENTS

| | | | |
|---|---|---|---|
| 3,562,924 | 2/1971 | Baerman et al. | 434/265 |
| 3,568,333 | 3/1971 | Clark | 434/265 |
| 3,872,609 | 3/1975 | Smrcka | 434/265 |
| 3,947,974 | 4/1976 | Gordon et al. | 434/266 |
| 3,994,075 | 11/1976 | Köhnke | 434/265 |
| 4,001,950 | 1/1977 | Blumensaadt | 434/265 |

Primary Examiner—Harland S. Skogquist
Attorney, Agent, or Firm—Mandeville and Schweitzer

[57] ABSTRACT

A training manikin for teaching cardiopulmonary resuscitation is provided with a hollow body in human form, with two nostril orifices and a mouth orifice, and an air passage extending from the nostril and mouth orifices entirely through the interior of the body to a flushing orifice, whereby the air passage is readily flushable through the introduction of a flushing fluid into the air passage through any one of the orifices. The manikin has simulated heart, pulmonary and pulse systems, with instant readout to a separate console box.

8 Claims, 8 Drawing Figures

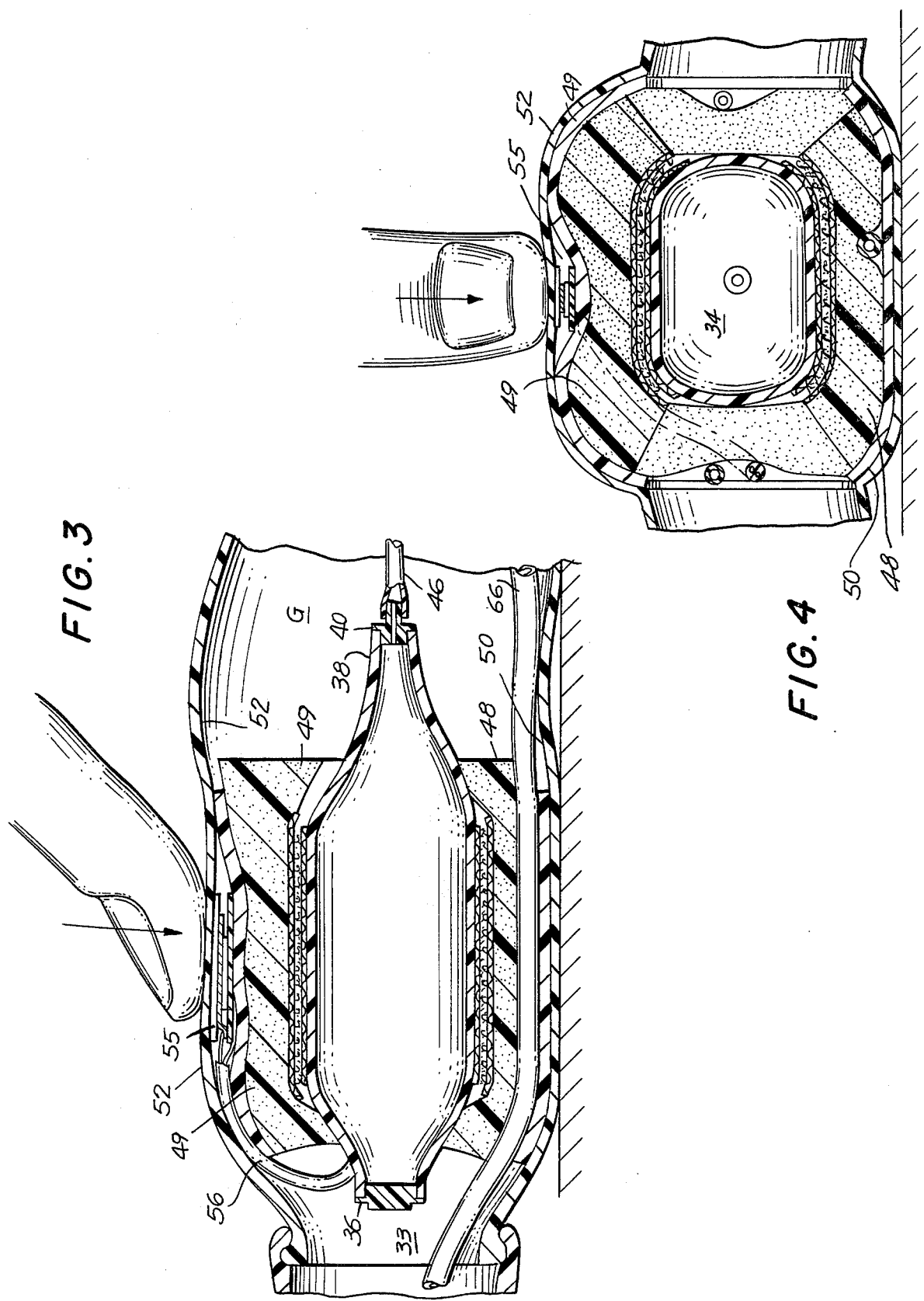

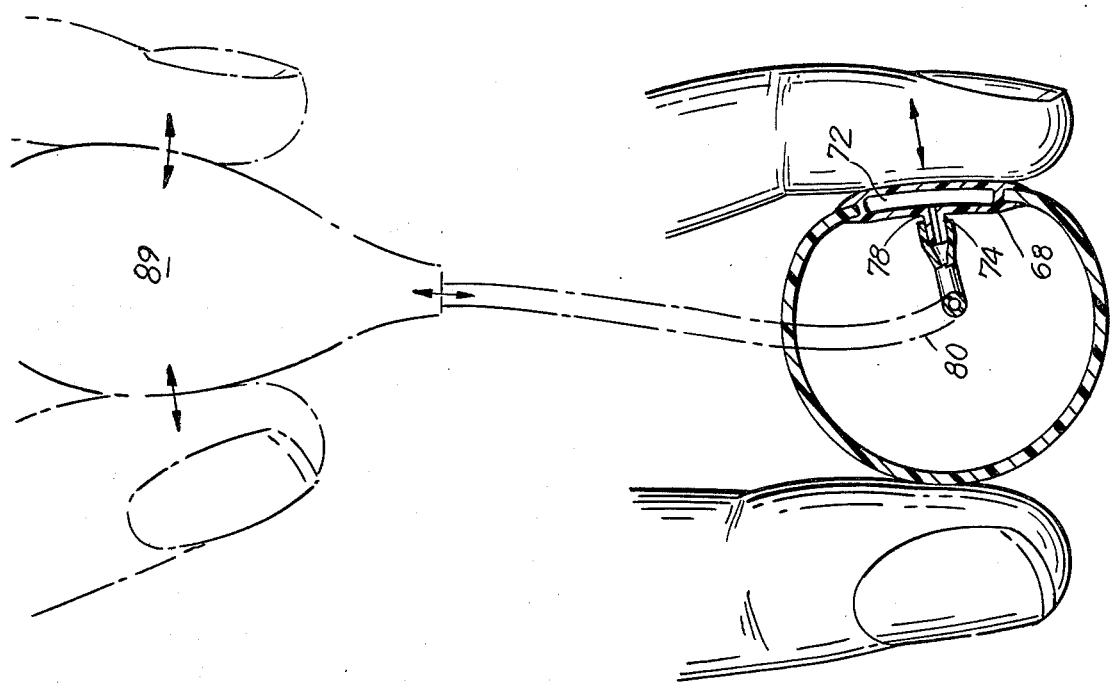

CARDIOPULMONARY RESUSCITATION MANIKIN WITH ANTISEPTIC CLEANING SYSTEM

BACKGROUND OF THE INVENTION

Manikins are frequently used as aids in teaching cardiopulmonary resuscitation (CPR). Students can practice and learn the proper techniques of chest massage and mouth-to-mouth resuscitation (MMR) without risk of harm to a live patient. It is important that these manikins simulate human appearance as closely as possible so that the students will be conditioned to act appropriately in a real life situation. Often the provision of verisimilitude requires the installation of complex and expensive instrumentation within the manikin.

In the CPR practice sessions, typically many students and instructors will take turns using the manikin and each will deposit germs from mouth-to-mouth breathing, not only on the manikin surface, but into the manikin itself, when the manikin has nose or mouth openings comprising a portion of a simulated respiratory tract. These germs may be inhaled by the next user and constitute a health problem. Antiseptic wipes will only remove the germs on the surface and will not clean the interior. Disassembling the manikin to remove and clean an interior respiratory tract is time consuming and may prove to be extremely difficult when the manikin construction is complex.

It is an object of this invention to provide a new and improved training manikin with a cleaning system that can easily be employed to clean thoroughly both the surface and the face and inside the nose and mouth openings after each use, without requiring the manikin to be disassembled or interfering with the simulation devices also inside the manikin.

It is another object of this invention to provide simplified but realistic simulation devices for cardiac, pulmonary and pulse systems, with instant readout of signal light and/or audio signal indicators.

It is another object of this invention to provide these simulation devices in a manikin the size, shape, and weight of a newborn or premature baby.

Training manikins in the past have provided systems simulating the heart, e.g. Clark U.S. Pat. No. 3,568,333, the lungs, e.g. Baerman U.S. Pat. No. 3,562,924, both the head and lungs, e.g. Smrcka U.S. Pat. No. 3,872,609, or the pulse, e.g. Gordon U.S. Pat. No. 3,947,974. None of these provides an easy to use and effective cleaning system, and none solves the problem of effectively, operatively housing all the simulated organ systems in a manikin the size of a newborn baby.

SUMMARY OF THE INVENTION

This invention provides a manikin in human form having a molded hollow body and head, with orifices at the nose and mouth simulating human nostrils and mouth. A passage leads from these openings, through the body cavity and out through a lower orifice. Outside the body, the passage is connected to a readout console box during simulated resuscitation procedures or to a flushing bag that can force a fluid up through the body and out the nose and mouth orifices. Within the body cavity are devices to simulate human organs, to detect proper location of pressure application, to measure the amount of pressure applied during chest massage, to measure air flow during mouth-to-mouth resuscitation, and to present an armpit pulse. However, the "lung" is placed inside the head to save space, and pneumatic switches in the console box are used instead of mechanical switches in the body. Thus, all the simulation devices will fit into a newborn size manikin.

BRIEF DESCRIPTION OF THE DRAWINGS

FIG. 3 is a sagittal cross-section of the chest portion of the manikin.
FIG. 4 is a cross-section of the chest portion of the manikin taken along line 4—4 of FIG. 2.
FIG. 5 is a sagittal cross-section of the head of the manikin.
FIG. 6 is a cross-section of an arm of the manikin taken along line 6—6 of FIG. 2.

DETAILED DESCRIPTION OF THE INVENTION

The manikins of the present invention are typically in human form, and accordingly, reference will be made hereafter to anatomical features.

Figure 1:
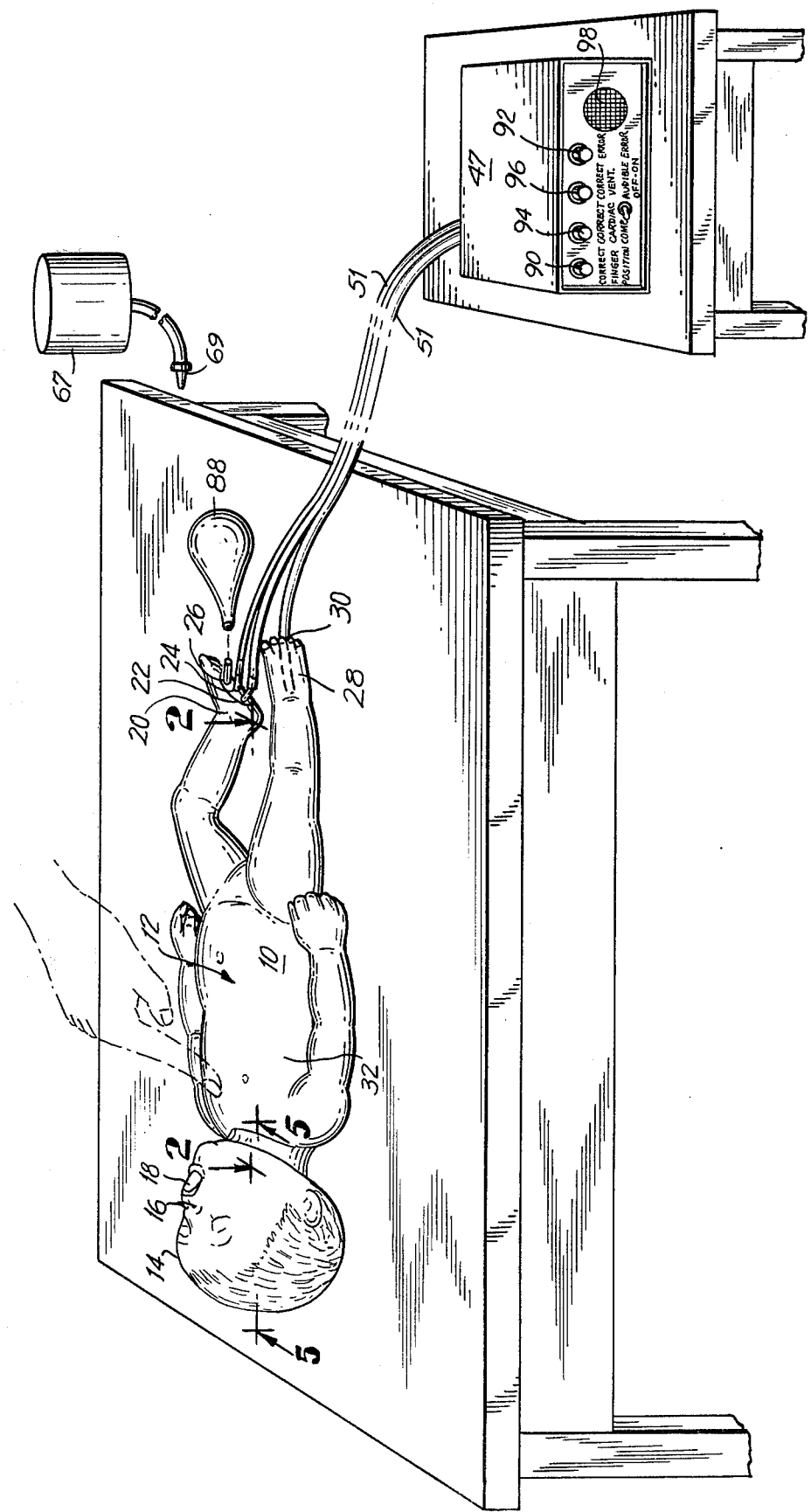
FIG. 1 is a top perspective view of a manikin.

FIG. 1 illustrates a new and improved training manikin 10 in the form, size and weight of a newborn baby having a body 12 and a head 14, both made of molded plastic. The head 14 has a neck portion 11 which is permanently sealed to a corresponding neck portion 13 on the body 12. The head 14 has two orifices 16 for nostrils and an orifice 18 for a mouth, which extend through the head wall 19. In the sole of the left foot 20 is an opening 22 in the body wall 21. In the opening 22 is an airtight closure 23 with three apertures 24, 25 and 26. In the sole of the right foot 28 is an opening 30 in the body wall 21. The body 12 also includes a chest portion 32 and a neck 33.

Figure 2:
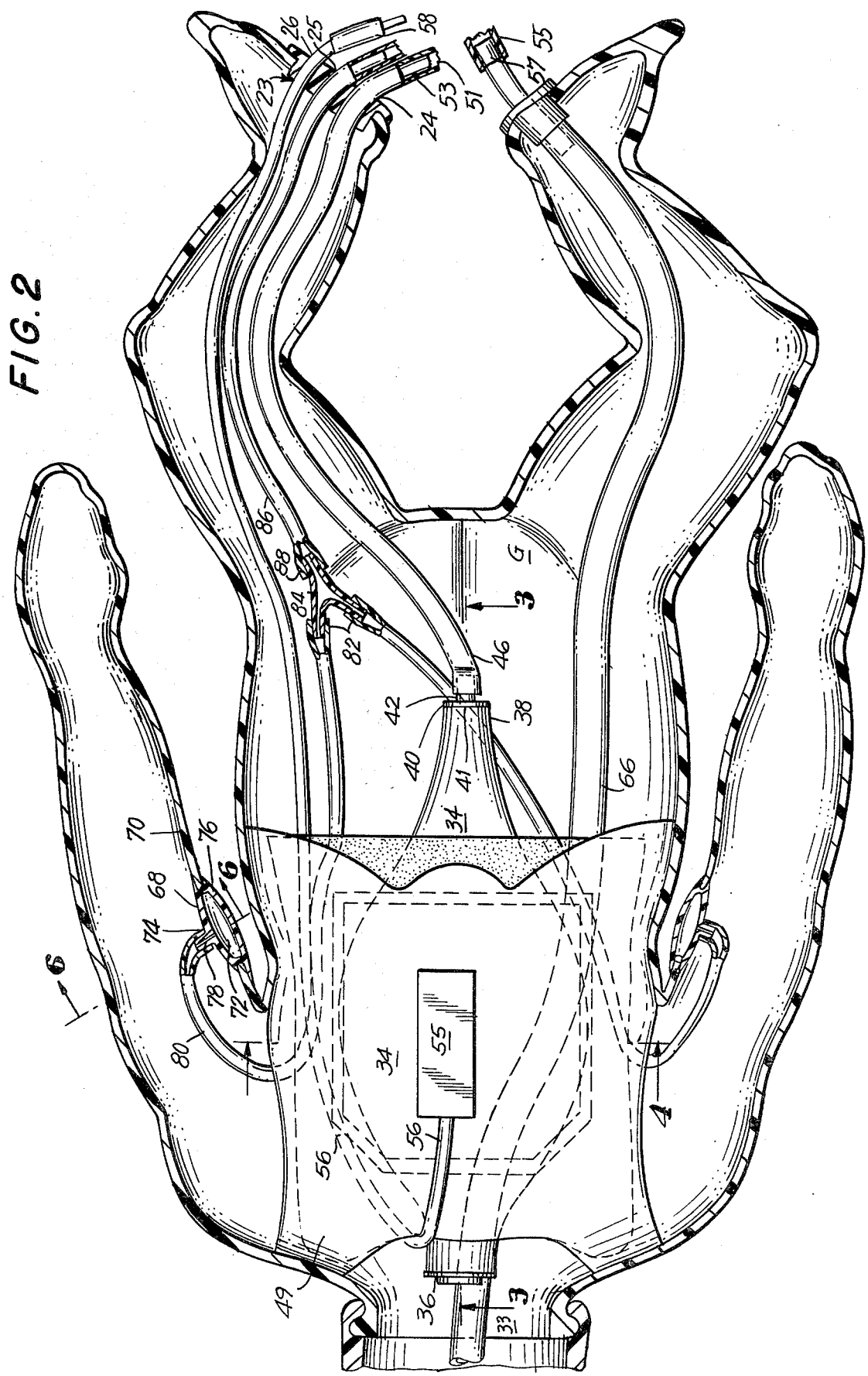
FIG. 2 is a top view of a horizontal cross-section of the manikin.

In FIGS. 2, 3 and 4 the various primary vital systems simulating major human organs and their functions are shown. In the present embodiment, these systems comprise a cardiac system, for training in chest massage, a pulmonary system, for training in MMR, and a system to present two armpit pulses.

Effective chest massage on a human requires that the rescuer apply considerable pressure on the chest—pressure sufficient to compress the chest of an adult 2" and the chest of a baby from ½" to ¾", depending on its age. To avoid injury to the victim, the pressure must be applied at only one critical cite, specifically upon the middle third of the sternum, i.e., on the nipple line in mid sternum. It is essential, therefore, that any CPR training manikin will be equipped with a signaling means to indicate when the pressure being applied is properly located at the critical site.

In the present embodiment, the cardiac system contains two subsystems: the first to measure the amount of chest compression, the second to signal the point of pressure application. Prior manikins typically include mechanical switches and associated wiring disposed entirely within the body. The novel manikin of the present invention contains only a single mechanical switch within the body, while utilizing four pneumatic switches in an exterior console box 47. The first subsystem has a deformable rubber bulb 34 located substernally in the chest 32 and centered beneath the critical site 35. The upper end of the bulb is located in the neck 33 and is formed with an upper orifice fitted with a closure 36. The lower end 38 is located in the center body cavity and has a lower orifice 39 fitted with a closure 40 having a central nipple 41. A flexible tube 46 is fitted over the nipple 41 and extends entirely through the body cavity and projects through aperture 24 in the closure 23.

Figure 8:
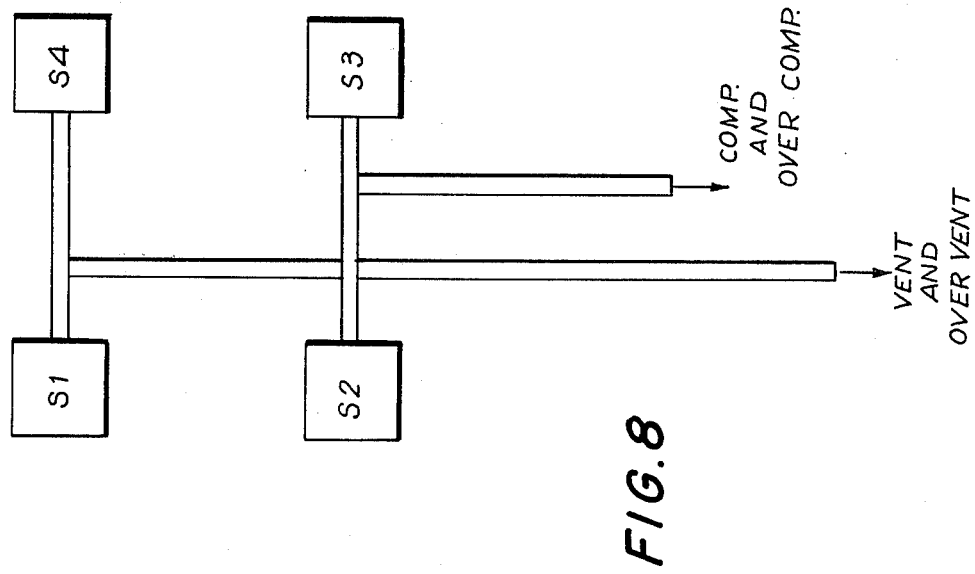
FIG. 8 is a schematic diagram of the simulated cardiac and pulmonary systems.
Figure 7:
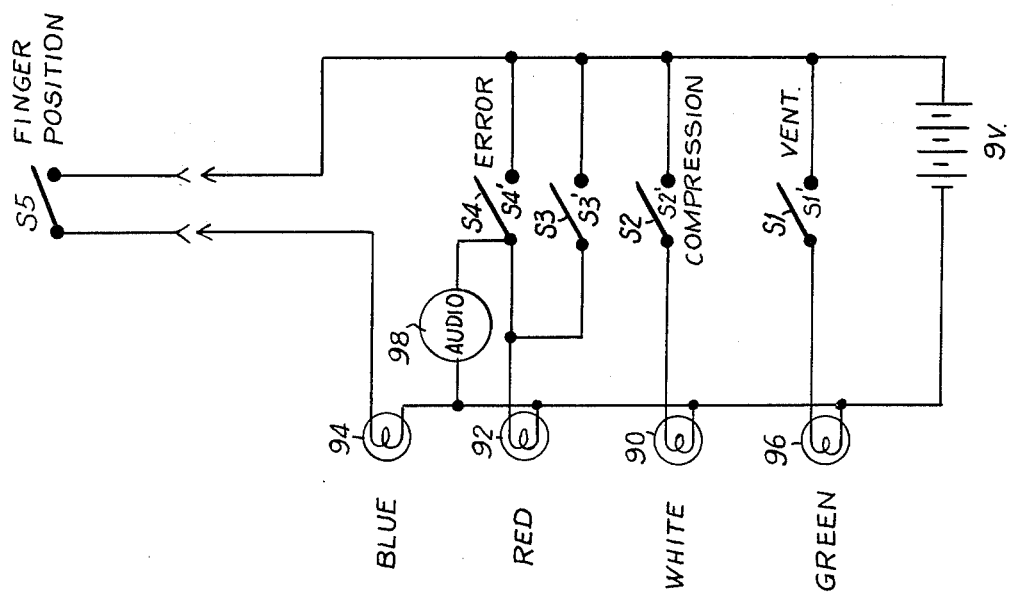
FIG. 7 is a schematic diagram for the circuit wiring used to indicate proper CPR.

In accordance with the invention, the outside end of the tube 46 is connected, via flexible tubing 51 through coupling 53, to two Conventry Corp. Model 505-3 mini-pneumatic switches S2, S4, housed within a console box 47. The contacts S2', S4' of the switches S2, S4 are normally open, but they are set to close when the air pressure through each one reaches a predetermined value. The bulb 34 is designed to provide air pressure upon compression such that contacts S2' close when the chest is depressed $\frac{1}{2}''$. When the contacts S2' are closed, they complete a circuit housed within the console box 47, (see FIGS. 7 and 8), energizing and lighting a white bulb 90, thereby visually indicating to a trainee that sufficient compression of the chest is being administered. Thus, a simple externally disposed pneumatic switch measuring air pressure is utilized in lieu of a mechanical switch contained within the body for measuring proper chest depression.

The switch S4 has contacts S4' that close when the chest is depressed over $\frac{3}{4}''$. These contacts S4' complete a circuit within the console box 47, lighting a red "Error" lamp 92. Thus, excess depression that would be harmful to a newborn is visually announced.

Located both dorsally and ventrally of the bulb 34 are pads 48, 49 of foam rubber or the like, which are fitted tightly between the bulb 34 and the interior walls 50, 52 of the body cavity, preventing the bulb 34 from shifting during use.

The second subsystem of the cardiac system, to signal the point of pressure, has a normally open locator switch S5 directly under the critical site 35 and between the ventral body wall 52 and the ventral pad 49. The switch S5 has contacts S5' which will close when 2 to 3 psi pressure is applied at the critical site. Leads 56 are connected to the two contacts S5' on the switch S5 and pass entirely through the body cavity and project out from aperture 26. The leads 56 terminate in a plug 58, which is connected to a mating receptacle in console box 47. When the switch contacts S5' are closed, due to pressure exerted on the critical site, the circuit is completed, and the blue bulb will be lighted.

Thus, if chest massage is being practiced properly, the white and blue lights will pulse on and off with the compression and release of the chest.

The second system is the pulmonary system, for training in MMR. As seen in FIGS. 2 and 5, passages 60 lead from the nostril and mouth orifices 16, 18 to a manifold 62 inside the head 14. The manifold 62 feeds through a fitting 61 into an inflatable bag 64, also within the head 14, which serves the purpose of a lung. In a manikin the size of a newborn baby, cardiac systems can fill the entire thorax and abdomen. Placing the lung in the head allows all the systems to be fully developed. From a second fitting 65 on the bag 64, a tube 66 passes entirely through the body 12 and projects out opening 30, which will be described later as the flushing orifice. Thus, a continuous passage simulating a respiratory tract is formed by passage 60, manifold 62, bag 64 and tube 66. The outside end of the tube 66 is removably connected, via flexible tubing 55 through a coupling 57 to two pneumatic switches of the type identified above, also housed within the console box 47. The contacts S1' of one of these switches S1 close when the air pressure reaches approximately 10 in. water, which is the proper insufflation pressure for a newborn baby. When contacts S1' are closed, a circuit within the signal box 47 is completed and a green bulb 96 will be lighted, visually signaling correct ventilation. The other pneumatic switch S3 has contacts which close when the air pressure exceeds 20 in. water, a dangerous and unacceptable level for a newborn. When closed, these contacts complete a circuit, lighting the red "Error" lamp described above. Thus, the student will know whether each breath is within the acceptable range. Alternatively, or in conjunction with the red "Error" lamp, an audible "Error" alarm may be sounded. A manual switch 91 on the console box 47 may be thrown, putting the audio circuitry in parallel with the lamp circuitry.

In lieu of this simple, inexpensive circuitry, it will be understood that other annunciators and circuitry could be utilized, such as oscillographs, teaching computers or microprocessing chips, depending on the degree of sophistication required.

After one student has used the manikin to practice MMR, the surface of the face of the manikin and the interior respiratory tract will carry germs from the student's breath and mouth. In accordance with this invention, the effective cleaning system itself is comprised of the very structure of the pulmonary system enabling the respiratory tract to be completely flushed with an antiseptic fluid without the need for additional elements. In practice, the tube 66 is detached from the signal box 47 and an antiseptic fluid is introduced into the tube 66 through the flushing orifice 30 and forced through the tube 66, the bag 64, the manifold 62, the passages 60 and out the nostril and mouth orifices 16, 18, where it is collected in a separate catch basin. One method is to elevate the tube 66 over the body 12 and pour the antiseptic fluid in through a funnel. Another method is to attach the tube 66 to a prepared open flushing bag 67 containing an antiseptic fluid with a fitting 69 sized to fit the tube 66. The ultimately simplified cleaning system does not interfere with the other simulation systems and takes a minimum of time to operate. It is also readily understood, so that even a novice student will always be able to maintain a clean and safe manikin. After the cleaning process, the tube 66 is reattached to the signal box 47, so that the manikin is immediately available for use by the next student.

The third system is a bifurcated pulse system. In newborn babies, the pulse is customarily taken under an armpit and accordingly a pulsing element is placed under each armpit. A section of the body wall 70 with an orifice 68 is covered by a hollow inflatable plastic arterial bag 72, which also has an orifice 74, so that the two orifices 68 and 74 are in registry. A cylindrical flange 78 projects from the arterial bag 72 through the orifices 68 and 74. A tube 80 leads from flange 78 to the central body cavity. The two tubes 80 lead into a manifold 84 through open fittings 82. From fitting 88 in the manifold 84, tube 86 leads through the body cavity and projects out aperture 25. Attached to the end of tube 86 is a compressible rubber bulb 89, for periodically increasing the air pressure inside the passage comprising tube 86, manifold 84, tube 80 and arterial bag 74. Thus, when the bulb is periodically compressed and released, a simulated pulse is generated as the bag 72 correspondingly expands and collapses. The simulated pulse is felt by a student with a finger on the bag 72.

It will be understood that while the embodiment contains only cardiac and pulse systems in addition to the pulmonary/flushing system, a pulmonary/flushing system could be effectively used in any manikin using any different or additional systems. Indeed, the more complexly a manikin is designed, the greater the advantage of such a simple, self-contained flushing system.

In order that the manikin be as lifelike as possible to the touch, it is provided with a soft flexible plastic body and a rib 74 and skull 76 made resilient and firm to simulate bone. The face is closely modeled on a human face so that there will be a tight mouth seal when the student's mouth is positioned properly. In addition, the hollow manikin is filled with a gel G to simulate faithfully the weight and feel of a human body. The use of a gel to simulate the weight of a baby is made practicable by the self-contained design of the flushing system and by having the pneumatic switches outside the body, where the gel cannot interfere with their function.

Thus, the trainees have a lifelike manikin. The first gives chest presses, in accordance with accepted resuscitation practice, making the blue and white lights flash, until he/she can do this without the error light and alarm coming on. The trainee then practices MMR by breathing into the manikin's nose and mouth, until he/she can produce consecutive flashes of the green light without error. The trainee then combines cardiac compressions and respiratory ventilations in a rhythm authorized by accepted CPR resuscitation standards.

I claim:

1. A training manikin for teaching cardiopulmonary resuscitation, which comprises
   (a) a hollow body in human form, with a chest having a sternum and two nostril orifices and a mouth orifice, and an air passage extending from the nostril and mouth orifice, whereby the air passage is readily flushable through the introduction of a flushing fluid into the air passage through any one of the orifices,
   (b) a pressure indicating system including a pressure sensing means located in the thoracic cavity substernally and centered at the nipple line on the mid-sternum and signal carrying means leading from the sensing means out of the body,
   (c) compression indicating system including compression sensing means located in the thoracic cavity substernally and centered at the nipple line on the mid-sternum and a conduit leading from the sensing means out of the body,
   (d) air flow sensing means removably connected to the flushing orifice,
   (e) pumping means connected to an inflatable envelope located on the outside surface of the body.

2. A training manikin according to claim 1, wherein the pressure indicating system further comprises:
   (a) a finger position switch located in the thoracic cavity substernally at the nipple line on the mid-sternum normally open and capable of being closed by pressure applied on the chest directly over the switch,
   (b) electrical wiring connecting to the switch forming a complete circuit when the switch is closed,
   (c) indicator means connected to the circuit to indicate when the circuit is complete.

3. A training manikin according to claim 2, wherein the compression sensing means comprises:
   (a) a deformable hollow bulb located in the thoracic cavity substernally and centered directly beneath the finger position switch,
   (b) a flexible conduit connected to and leading from the bulb out of the body,
   (c) air flow measuring means connected to the conduit outside the body,
   (d) an electrical circuit connected to the measuring means forming a complete circuit when the measuring means measures the air flow as exceeding a critical, predetermined amount,
   (e) indicator means connected to the circuit to indicate when the circuit is complete.

4. A training manikin according to claim 1, wherein the air passage comprises:
   (a) a manifold,
   (b) first flexible conduits leading from the manifold to the nostril and mouth orifices,
   (c) a collapsable hollow lung connected to the manifold,
   (d) a second flexible conduit leading from the lung entirely through the interior of the body to the flushing orifice.

5. A training manikin according to claim 4, wherein the air flow sensing means comprises:
   (a) air flow measuring means removably connected to the flushing orifice,
   (b) an electrical circuit connected to the measuring means forming a complete circuit when the measuring means measures the air flow as exceeding a critical, predetermined amount,
   (c) indicator means connected to the second circuit to indicate when the circuit is complete.

6. A training manikin according to claim 1, wherein the body has the size and shape of a newborn baby.

7. A training manikin according to claim 6 having
   (a) a plastic body having the softness and resiliency of the skin of a newborn baby, and filled with fluid,
   (b) a cranial section of the head having the shape and resiliency of a newborn baby's skull,
   (c) a ribcage section of the chest having the shape and resiliency of a newborn baby's ribcage.

8. A training manikin according to claim 1, wherein the air passage further comprises a hollow deformable fluid-filled bag removably connected to the flushing orifice outside the body.

* * * * *